(12) United States Patent
Jarry et al.

(10) Patent No.: US 9,866,325 B1
(45) Date of Patent: Jan. 9, 2018

(54) SYSTEM AND METHOD FOR BIDIRECTIONAL EXCHANGE OF DATA WITH A MOBILE APPARATUS THROUGH AT LEAST ONE LEAKY OPTICAL FIBER

(71) Applicant: Les Industries Show Canada Inc, Laval (CA)

(72) Inventors: Stephan Jarry, Oka (CA); Jean Labadie, Montreal (CA)

(73) Assignee: Les Industries Show Canada Inc, Laval (CA)

( * ) Notice: Subject to any disclaimer, the term of this patent is extended or adjusted under 35 U.S.C. 154(b) by 0 days.

(21) Appl. No.: 15/470,948

(22) Filed: Mar. 28, 2017

(51) Int. Cl.
*H04B 10/00* (2013.01)
*H04B 10/25* (2013.01)

(52) U.S. Cl.
CPC ..... *H04B 10/2503* (2013.01); *H04B 10/2504* (2013.01)

(58) Field of Classification Search
CPC ............ H04B 10/2503; H04B 10/2504; H04B 10/25; H04B 10/2575; H04B 10/27; H04B 10/40; H04B 10/43; H04B 10/12; H04B 10/1123; H04B 10/1143; H04B 10/80
USPC .................................................. 398/116, 115
See application file for complete search history.

(56) References Cited

U.S. PATENT DOCUMENTS

| 7,583,901 B2 | 9/2009 | Nakagawa et al. |
| 8,374,506 B2 | 2/2013 | Stark |
| 2007/0274727 A1 | 11/2007 | Haruyama et al. |

FOREIGN PATENT DOCUMENTS

| EP | 0188085 A2 * | 7/1986 | ............... H04B 9/00 |
| EP | 2 056 492 A1 * | 5/2009 | ............. H04B 10/12 |
| EP | 2056492 A1 | 5/2009 | |

* cited by examiner

*Primary Examiner* — M. R. Sedighian
(74) *Attorney, Agent, or Firm* — IP Delta Plus Inc.

(57) ABSTRACT

Method and system for bidirectional exchange of data with a mobile apparatus through at least one leaky optical fiber. An optical reception module of the mobile apparatus receives an incoming optical signal optically leaked from the leaky optical fiber. An optical to electrical conversion module of the mobile apparatus converts the incoming optical signal into an incoming electrical signal. A control unit of the mobile apparatus processes the incoming electrical signal to extract incoming data from the incoming electrical signal, and processes outgoing data to generate an outgoing electrical signal transporting the outgoing data. An electrical to optical conversion module of the mobile apparatus converts the outgoing electrical signal into an outgoing optical signal. An optical transmission module of the mobile apparatus injects the outgoing optical signal into the leaky optical fiber. For example, the fiber is positioned along a path of a rail-guided trolley travelling along a rail.

18 Claims, 11 Drawing Sheets

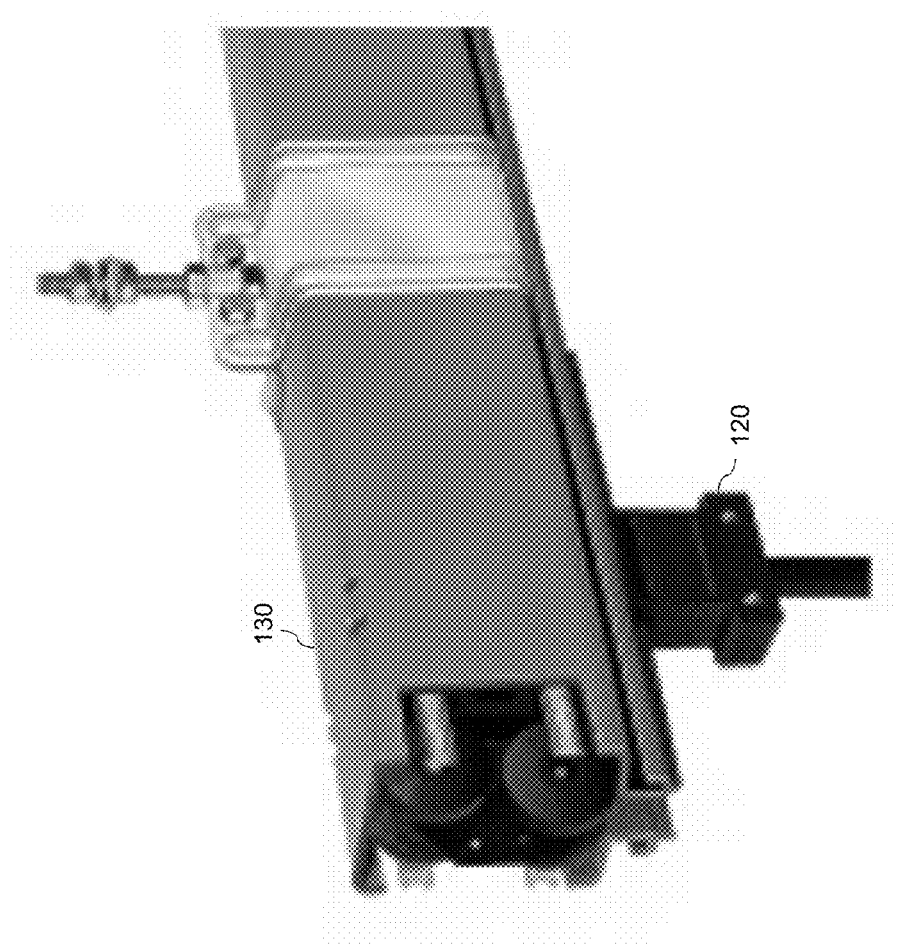

SYSTEM AND METHOD FOR BIDIRECTIONAL EXCHANGE OF DATA WITH A MOBILE APPARATUS THROUGH AT LEAST ONE LEAKY OPTICAL FIBER

TECHNICAL FIELD

The present disclosure relates to the field of bi-directional transmission of data through optical fibers, and more specifically to a system and method for bidirectional exchange of data with a mobile apparatus through at least one leaky optical fiber.

BACKGROUND

In the entertainment and show industries, the emergence of immersive and augmented reality technologies brings about an increased usage of mobile and high-speed data communications, to link in real-time user and the immersive or enhanced environment. For example, a rail-guided trolley travelling along a rail provides an interactive entertaining experience to its passengers. The rail-guided trolley is connected in real-time to a control computer, which generates and transmits dedicated content (e.g. images, sounds, control commands, etc.) for providing a digital and interactive environment to each passenger of the rail guided trolley. In order to allow this real-time connectivity between the control computer and the rail-guided trolley, information need to be communicated at high speed and in a safely manner between these two entities.

Technologies based on non-confined microwave signals are not adapted to this context, since they are prone to interferences and degradations of the quality of the microwave signals (due to the amount and variety of interfering microwave signals generally present in any particular location). Technologies such as a leaky coax (e.g. a Wi-Fi based leaky coax) or confined microwave signals (using waveguides) have also been used in this context for transmitting the information in real-time, but they are generally too slow.

Technologies based on leaky optical fibers have also been used in this context for transmitting the information in real-time. The optical fibers provide an environment less prone to external interferences, and further provide high-speed information transfer. However, so far, leaky optical fibers have been used for transmitting information from a control platform to a mobile apparatus. For example, US patent application US 2007/0274727 A1 published on Nov. 29, 2007 discloses a communications system implementing high-speed, high quality communications using a leaky optical fiber. However, the leaky optical fiber is only used for transmitting data from an original transmitter to a mobile receiver. In a particular embodiment of the communications system, the mobile receiver comprises a leaky optical fiber for emitting optical signals transporting data to be transmitted all the way back to the original transmitter. However, the emitted optical signals are received by fixed receivers positioned along the path of the mobile receiver, and forwarded by fixed relays (collocated with the fixed receivers) to the original transmitter via a fixed network. Thus, for the transmission of data all the way back from the mobile receiver to the original transmitter, the leaky optical fiber is used only for emitting optical signals.

There is therefore a need for a new system and method allowing a bidirectional exchange of data with a mobile apparatus through at least one leaky optical fiber.

SUMMARY

According to a first aspect, the present disclosure relates to a system for bidirectional exchange of data with a mobile apparatus through at least one leaky optical fiber. The system comprises at least one leaky optical fiber and the mobile apparatus. The mobile apparatus comprises an optical reception module for receiving an incoming optical signal optically leaked from the at least one leaky optical fiber. The mobile apparatus comprises an optical to electrical conversion module for converting the incoming optical signal into an incoming electrical signal. The mobile apparatus comprises a control unit for processing the incoming electrical signal to extract incoming data from the incoming electrical signal, and processing outgoing data to generate an outgoing electrical signal transporting the outgoing data. The mobile apparatus comprises an electrical to optical conversion module for converting the outgoing electrical signal into an outgoing optical signal. The mobile apparatus comprises an optical transmission module for injecting the outgoing optical signal into the at least one leaky optical fiber.

According to a second aspect, the present disclosure relates to a method for bidirectional exchange of data with a mobile apparatus through at least one leaky optical fiber. The method comprises receiving, by an optical reception module of the mobile apparatus, an incoming optical signal from the at least one leaky optical fiber. The incoming optical signal is leaked from the at least one leaky optical fiber. The method comprises converting, by an optical to electrical conversion module of the mobile apparatus, the incoming optical signal into an incoming electrical signal. The method comprises processing, by a control unit of the mobile apparatus, the incoming electrical signal to extract incoming data from the incoming electrical signal. The method comprises processing, by the control unit of the mobile apparatus, outgoing data to generate an outgoing electrical signal transporting the outgoing data. The method comprises converting, by an electrical to optical conversion module of the mobile apparatus, the outgoing electrical signal into an outgoing optical signal. The method comprises injecting, by an optical transmission module of the mobile apparatus, the outgoing optical signal into the at least one leaky optical fiber.

According to a third aspect, the present disclosure relates to a system for bidirectional exchange of data with a plurality of mobile apparatus through a plurality of leaky optical fibers. The system comprises the plurality of leaky optical fiber and the plurality of mobile apparatus. Each mobile apparatus comprises an optical reception module for receiving an incoming optical signal from a first one among the plurality of leaky optical fibers. The incoming optical signal is leaked from the first one among the plurality of leaky optical fibers. Each mobile apparatus comprises an optical to electrical conversion module for converting the incoming optical signal into an incoming electrical signal. Each mobile apparatus comprises a control unit for processing the incoming electrical signal to extract incoming data from the incoming electrical signal, and processing outgoing data to generate an outgoing electrical signal transporting the outgoing data. Each mobile apparatus comprises an electrical to optical conversion module for converting the outgoing electrical signal into an outgoing optical signal. Each mobile apparatus comprises an optical transmission module for injecting the outgoing optical signal into a second one among the plurality of leaky optical fibers. The system further comprises a fixed apparatus for bidirectionally exchanging the incoming data and the outgoing data with the plurality of mobile apparatus through the plurality of leaky optical fibers.

BRIEF DESCRIPTION OF THE DRAWINGS

Embodiments of the disclosure will be described by way of example only with reference to the accompanying drawings, in which:

FIGS. 2A and 2B illustrate an exemplary mobile apparatus consisting of a rail-guided trolley;

DETAILED DESCRIPTION

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address one or more of the problems related to the bidirectional exchange of data between a mobile apparatus and a fixed apparatus through leaky optical fiber(s) positioned along a path of the mobile apparatus.

The following terminology is used throughout the present disclosure:

Leaky optical fiber: an optical fiber for which the optical signals propagating along the optical fiber leak through the external surface of the optical fiber, and reach the environment surrounding the optical fiber. The leakage generates a progressive attenuation of the optical signals propagated along the optical fiber. A leaky optical fiber can be used for transmitting optical signals by way of leakage. The present disclosure also contemplates injecting optical signals in the leaky optical fiber, for further transmission along the leaky optical fiber.

Data: data transmitted between a first and a second entity, where the first entity transmits data which are received by the second entity; and the second entity simultaneously or alternatively transmits data which are received by the first entity.

Figure 1:
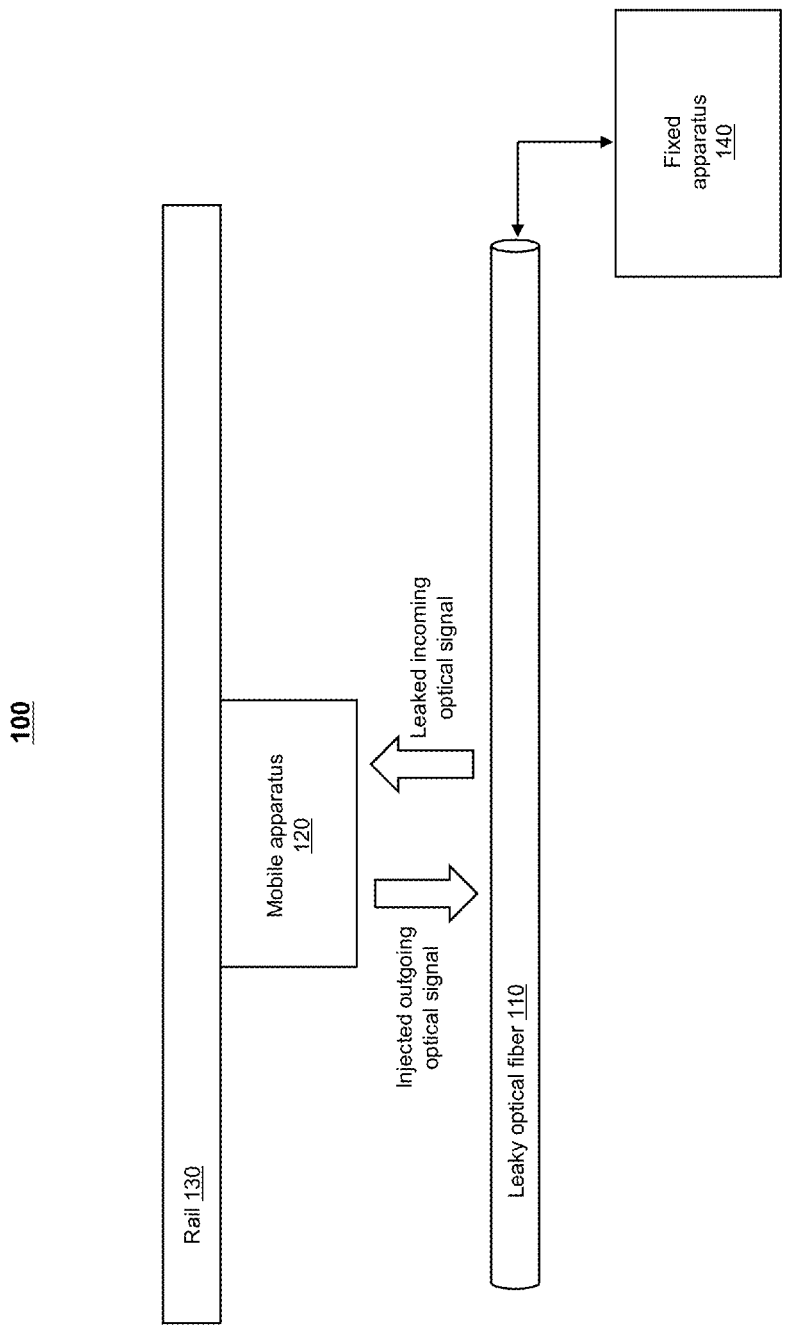
FIG. 1 illustrates a system for bidirectional exchange of data with a mobile apparatus through at least one leaky optical fiber.

Referring now to FIG. 1, a system 100 for bidirectional exchange of data with a mobile apparatus through at least one leaky optical fiber is represented.

The system 100 comprises at least one leaky optical fiber 110. Although a single leaky optical fiber 110 is represented in FIG. 1, the system 100 may comprise more than one leaky optical fiber as will be illustrated later in the description.

The system 100 comprises a mobile apparatus 120. The mobile apparatus 120 bidirectionally exchanges data with a fixed apparatus 140 through the leaky optical fiber 110. The communication between the mobile apparatus 120 and the fixed apparatus 140 is bidirectional. For instance, the fixed apparatus 140 injects an incoming optical signal comprising incoming data into the leaky optical fiber 110. The leaky optical fiber 110 transports the incoming optical signal. The incoming optical signal is leaked by the leaky optical fiber 110, and received by the mobile apparatus 120. The mobile apparatus 120 extracts the incoming data from the incoming optical signal, and further processes the incoming data. The mobile apparatus 120 also generates outgoing data, and injects an outgoing optical signal transporting the outgoing data into the leaky optical fiber 110. The leaky optical fiber 110 transports the outgoing optical signal. The outgoing optical signal is received by the fixed apparatus 140, and the outgoing data transported by the outgoing optical signal are further processed by the fixed apparatus 140.

Figure 2A:
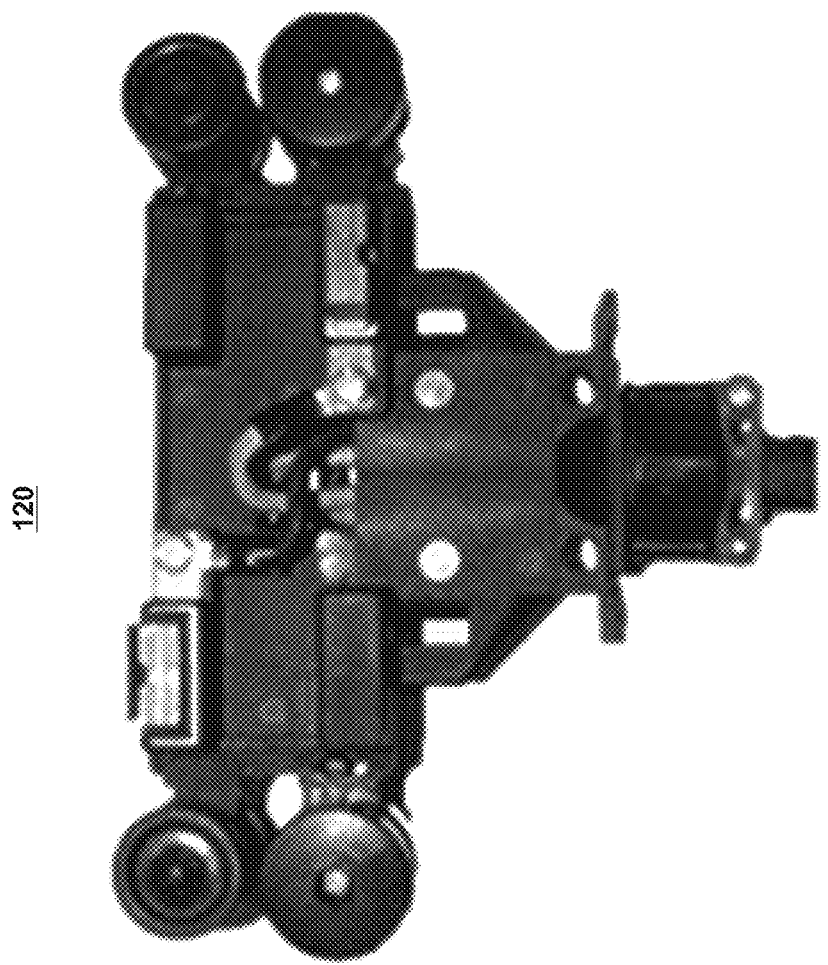

Referring now concurrently to FIGS. 1, 2A and 2B, a mobile apparatus 120 consisting of a rail-guided trolley travelling along a rail 130 is represented. FIG. 2A represents the rail-guided trolley 120 alone, while FIG. 2B represents the rail-guided trolley 120 being guided by the rail 130.

The rail-guided trolley 120 is a technology well known in the art. It comprises a plurality of wheels actuated by one or more motors, the actuation of the plurality of wheels allowing the rail-guided trolley 120 to move along the rail 130.

The leaky optical fiber 110 is positioned along the path of the rail 130. Thus, the rail-guided trolley 120 is adapted for receiving an incoming optical signal from the leaky optical fiber 110 and injecting an outgoing optical signal into the leaky optical fiber 110 at any position of the rail-guided trolley 120 along the rail 130. The rail 130 may be longitudinal, curved, or composed of combination of longitudinal section(s) and curved section(s).

The rail-guided trolley 120 is for illustration purposes only. The mobile apparatus 120 may consist of any apparatus capable of moving along a pre-defined path. The leaky optical fiber 110 is positioned along the pre-defined path. The mobile apparatus 120 is capable of an axial movement along the pre-defined path in both directions (forward and backward), at a constant or variable speed.

The mobile apparatus 120 is used in an indoor environment, in an outdoor environment, or a combination of indoor and outdoor environment (e.g. the rail 130 is partially located inside a building and partially located outside the building). Furthermore, the environment in which the mobile apparatus 120 is used may include conditions generating interferences for communication systems, such as smoke, rain, water projections, dust, sand, etc. The leaky optical fiber 110 is less subject to interferences generated by these particular conditions, by comparison to radio-frequency based communication systems.

An exemplary system 100 consists of a rail-guided trolley 120 moving along a rail 130, the total distance of the path of the rail-guided trolley 120 along the rail 130 being substantially 300 meters and the path supporting a minimum radius of curvature of up to substantially 2 meters. The rail-guided trolley 120 moves at a speed of up to substantially 22 kilometers per hour (or 6 meters per second).

Figure 3:
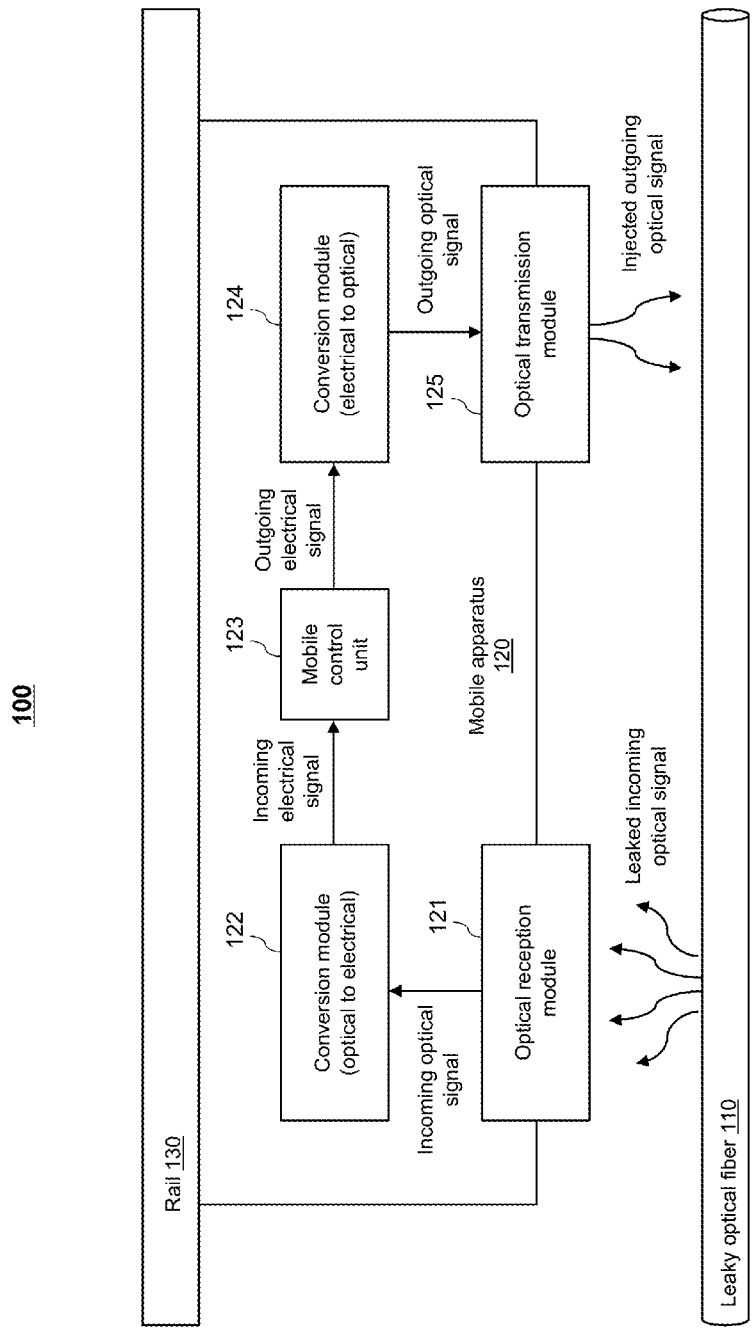
FIG. 3 illustrates the system represented in FIG. 1 using a single leaky optical fiber.
Figure 8:
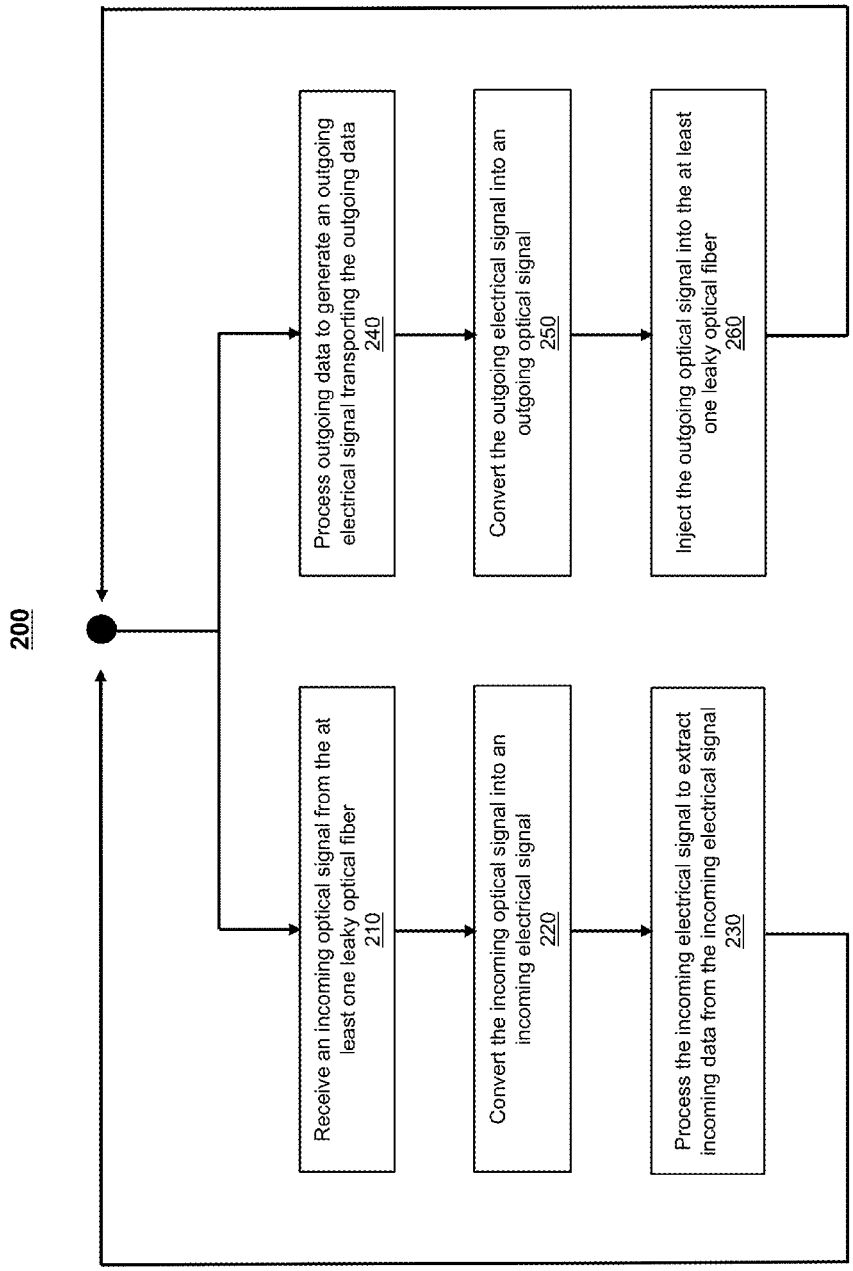
FIG. 8 illustrates a method for bidirectional exchange of data with a mobile apparatus through at least one leaky optical fiber.

Referring now concurrently to FIGS. 3 and 8, the system 100 and a method 200 for bidirectional exchange of data with the mobile apparatus 120 through a single leaky optical fiber 110 are represented. FIG. 3 represents the system 100 and FIG. 8 represents the method 300. The fixed apparatus 140 illustrated in FIG. 1 is not represented in FIG. 3 for simplification purposes.

The mobile apparatus 120 comprises an optical reception module 121, an optical to electrical conversion module 122, a mobile control unit 123, an electrical to optical conversion module 124, and an optical transmission module 125.

Steps 210, 220 and 230 of the method 200 illustrate the reception by the mobile apparatus 120 of an incoming optical signal from the leaky optical fiber 110. Steps 240, 250 and 260 of the method 200 illustrate the injection by the mobile apparatus 120 of an outgoing optical signal into the leaky optical fiber 110. The reception (steps 210, 220 and 230) and the injection (steps 240, 250 and 260) may be performed alternatively or concurrently.

At step 210, the optical reception module 121 receives an incoming optical signal from the leaky optical fiber 110. The incoming optical signal is leaked from the leaky optical fiber 110.

At step 220, the optical to electrical conversion module 122 converts the incoming optical signal into an incoming electrical signal.

At step 230, the control unit 123 processes the incoming electrical signal to extract incoming data from the incoming electrical signal. The incoming data are further processed by the control unit 123, or by another component of the mobile apparatus 120 not represented in FIG. 3 for simplification purposes.

At step 240, the control unit 123 processes outgoing data to generate an outgoing electrical signal transporting the outgoing data. The outgoing data are generated by the control unit 123, or by another component of the mobile apparatus 120 not represented in FIG. 3 for simplification purposes.

At step 250, the electrical to optical conversion module 124 converts the outgoing electrical signal into an outgoing optical signal.

At step 260, the optical transmission module 125 injects the outgoing optical signal into the leaky optical fiber 110.

The optical reception module 121 and the optical transmission module 125 may be integrated into a single optical transceiver, capable of receiving incoming optical signals leaked from the leaky optical fiber 110 and injecting outgoing optical signals into the leaky optical fiber 110.

The optical to electrical conversion module 122 and the electrical to optical conversion module 124 may be integrated into a single component, capable of performing both optical to electrical conversion and electrical to optical conversion.

Figure 4:
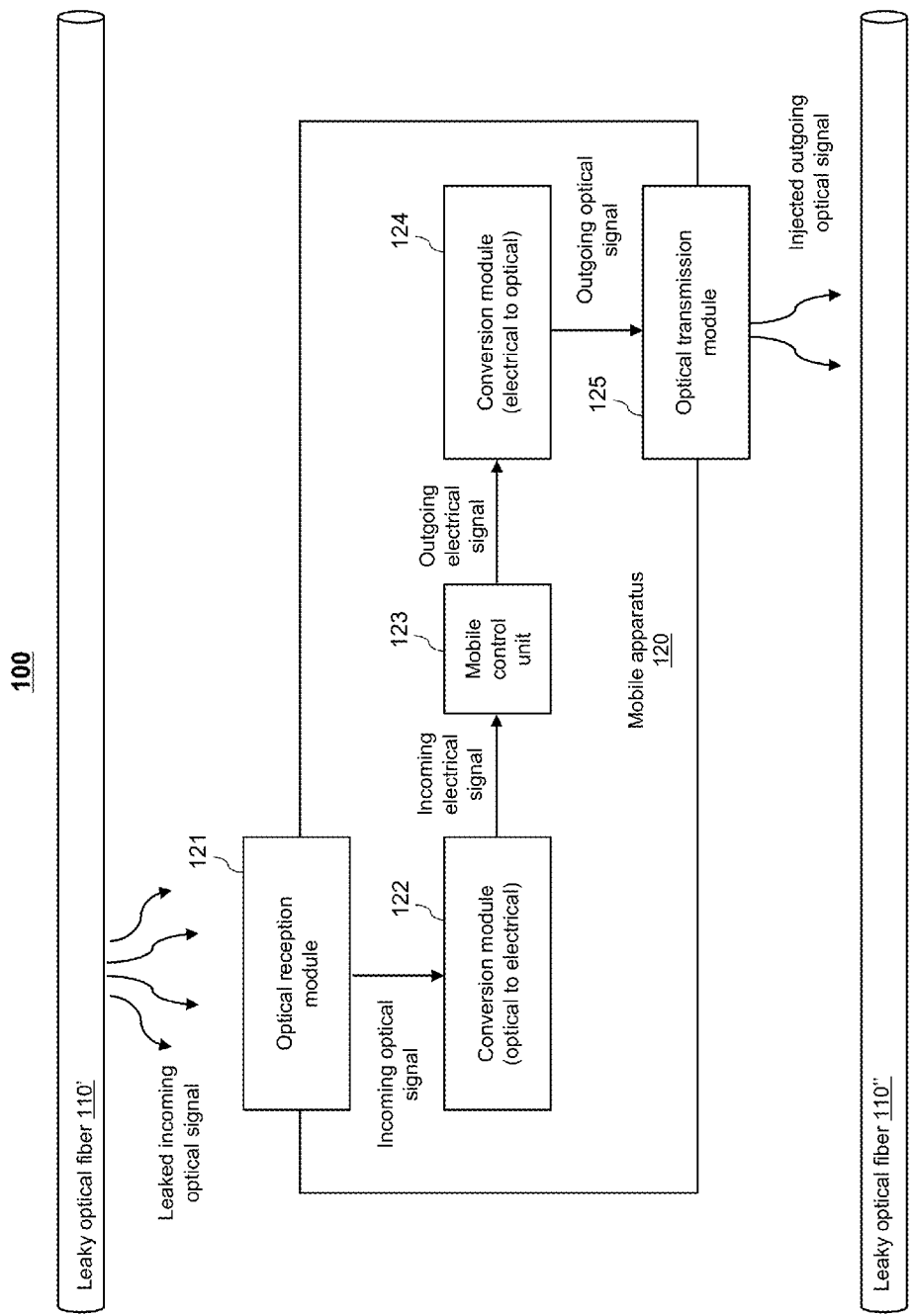
FIG. 4 illustrates the system represented in FIG. 1 using a first leaky optical fiber for reception and a second leaky optical fiber for transmission.

Referring now concurrently to FIGS. 4 and 9, the system 100 and the method 200 for bidirectional exchange of data with the mobile apparatus 120 through two leaky optical fibers are represented. FIG. 4 represents the system 100 with two independent leaky optical fibers 110 and 110'. The fixed apparatus 140 and rail 130 illustrated in FIG. 1 are not represented in FIG. 4 for simplification purposes.

Instead of using a single leaky optical fiber 110 as illustrated in FIG. 3, a first leaky optical fiber 110' with characteristics optimized for receiving the leaked incoming optical signal is used, and a second leaky optical fiber 110" with characteristics optimized for injecting the outgoing optical signal is used. Examples of optimized characteristics of each optical fiber 110' and 110" will be detailed later in the description.

At step 210, the optical reception module 121 receives an incoming optical signal from the leaky optical fiber 110'. The incoming optical signal is leaked from the leaky optical fiber 110'.

At step 220, the optical to electrical conversion module 122 converts the incoming optical signal into an incoming electrical signal.

At step 230, the control unit 123 processes the incoming electrical signal to extract incoming data from the incoming electrical signal. The incoming data are further processed by the control unit 123, or by another component of the mobile apparatus 120 not represented in FIG. 3 for simplification purposes.

At step 240, the control unit 123 processes outgoing data to generate an outgoing electrical signal transporting the outgoing data. The outgoing data are generated by the control unit 123, or by another component of the mobile apparatus 120 not represented in FIG. 3 for simplification purposes.

At step 250, the electrical to optical conversion module 124 converts the outgoing electrical signal into an outgoing optical signal.

At step 260, the optical transmission module 125 injects the outgoing optical signal into the leaky optical fiber 110".

FIGS. 3 and 4 are only schematic representations of the mobile apparatus 120 and the leaky optical fibers 110, 110' and 110", and do not intend to represent a realistic physical deployment of these entities. In particular, the positioning of the leaky optical fibers 110, 110' and 110" with respect to the path followed (e.g. the rail 130 represented in FIGS. 1 and 2B) by the mobile apparatus 120 depends on each specific implementation of the system 100. The only constraint is that the positioning of the leaky optical fibers 110, 110' and 110" allows reception of the leaked incoming optical signal and injection of the outgoing optical signal.

Referring now concurrently to FIGS. 3 and 4, characteristics of the leaky optical fibers 110, 110' and 110", and details of the components of the mobile apparatus 120, will be described.

In the ideal case, the single leaky optical fiber 110 can be used, because the optical characteristics of the leaky optical fiber 110 for allowing reception of the leaked incoming optical signals by the optical reception module 121 are compatible with the optical characteristics of the leaky optical fiber 110 for allowing transmission of the injected outgoing optical signals by the optical transmission module 125. Otherwise, the dedicated leaky optical fiber 110' having optical characteristics for allowing reception of the leaked incoming optical signals by the optical reception module 121 is used independently of the leaky optical fiber 110" having optical characteristics for allowing transmission of the injected outgoing optical signals by the optical transmission module 125.

In a particular configuration, the leaky optical fibers 110, 110' and 110" are adapted for transmitting bidirectional optical signals having a bitrate of up to one Gigabit per second (1 Gbit/s) and a low latency (lower than one millisecond). This configuration corresponds to the transmission of broadband telecom signals, for which standard commercial components can be used for the implementation of the optical reception module 121 and the optical transmission module 125.

The optical characteristics of the leaky optical fibers 110, 110' and 110" include the level of leakage from the leaky optical fiber for allowing collection (leaded incoming optical signals) or injection (injected outgoing optical signals) of an appropriate level of optical signals. The optical characteristics of the leaky optical fibers 110, 110' and 110" also include the waveguide dispersion for allowing transmission of the optical signals at a defined bitrate (e.g. 1 Gbit/s) over a given distance (e.g. 300 meters). These optical characteristics are usually not compatible, since optical fibers used for the transmission of broadband telecom signals (e.g. 1 Gbit/s) are generally optimized for having a low level of leakage, while optical fibers having a high level of leakage (e.g. fibers used for illumination) are not designed for transmitting broadband telecom signals. The choice of the optical fiber is therefore a compromise between these two characteristics.

For the reception of the leaked incoming optical signals by the optical reception module 121, a mono-mode Erbium-doped optical fiber operating at a wavelength in the C-band (infrared band from 1530 to 1565 nanometers) has been tested successfully. This optical fiber being mono-mode, it supports telecom signals at 1 Gbit/s. One benefit of the Erbium-doped optical fiber is the nature of absorption/reemission of Erbium, which allows to have an important level of leakage, while also allowing a transmission of the optical signal in the leaky optical fiber over a satisfying distance despite the optical signal leakage.

For the injection of the injected outgoing optical signals by the optical transmission module 125, a graded-index multi-mode optical fiber has been tested successfully.

Thus, in a configuration with two independent leaky optical fibers 110' for reception and 110" for injection, the leaky optical fiber 110' can be implemented by the mono-mode Erbium-doped optical fiber operating at a wavelength of 1550 nanometers, and the leaky optical fiber 110" can be implemented by the graded-index multi-mode optical fiber.

In a configuration with a single leaky optical fiber 110 for reception and injection, the mono-mode Erbium-doped optical fiber operating at a wavelength of 1550 nanometers is well adapted for reception, but not adapted for transmission.

When a rail 130 is used for the system 100, a second rail (not represented in the Figures) parallel to the first rail 130 may be used for protecting the leaky optical fiber 110 of FIG. 3, and at least one of the leaky optical fibers 110' and 110" of FIG. 4. For instance, the second rail 130 protects the leaky optical fiber(s) against dust, water, smoke, sand, etc. The leaky optical fibers are embedded inside the second rail. The second rail is positioned at a distance of the first rail 130 (and at an orientation with respect to the first rail 130) allowing reception of the leaked incoming optical signal and injection of the injected outgoing optical signal. Furthermore, the second rail is designed for allowing bidirectional exchange of optical signals between the embedded leaky optical fiber(s) and the mobile apparatus 120. For instance, the second rail includes an opening through which the bidirectional exchange of optical signals between the embedded leaky optical fiber(s) and the mobile apparatus 120 occurs. Alternatively, the second rail includes a specific material (e.g. glass) through which the bidirectional exchange of optical signals between the embedded leaky optical fiber(s) and the mobile apparatus 120 occurs.

Although the present system 100 has been described with the leaky optical fibers 110, 110' and 110", another type of leaky optical guide having properties like the previously described leaky optical fibers may be used for implementing the system 100.

Commercial off-the-shelf components can be used for the components of the mobile apparatus 120, to reduce the costs. The following examples are for illustration purposes only. The components of the mobile apparatus 120 may be implemented with other types of components, as a person skilled in the art would readily understand.

The optical reception module 121 includes an optical recollection device for collecting the leaked incoming optical signals from the leaky optical fibers 110 or 110'. The optical to electrical conversion module 122 includes a photodiode for converting the leaked incoming optical signals into the incoming electrical signals. The conversion module 122 also includes an electronic amplifier for amplifying the incoming electrical signals. The conversion module 122 further includes a media converter for converting the amplified incoming electrical signals into incoming signals which can be processed by the mobile control unit 123. For instance, the media converter converts the amplified incoming electrical signals into incoming Ethernet electrical signals, which can be easily processed by standards components implemented on the mobile control unit 123, as is well known in the art. With respect to the optical recollection device, a V-groove shaped reflecting surface may be used to increase the level of optical signal collected by the optical recollection device. The reflecting surface is positioned opposite to the optical recollection device, in order to reflect light towards the optical recollection device.

The electrical to optical conversion module 125 includes a media converter for converting the outgoing electrical signals (e.g. Ethernet electrical signals) received from the mobile control unit 123 into the outgoing optical signals. The conversion module 125 also includes an optical amplifier for amplifying the outgoing optical signals. The optical transmission module 125 includes an optical injection device for injecting the outgoing optical signals into the leaky optical fibers 110 or 110". For instance, the optical injection device consists of a laser. An optical lens can further be used for the injection of the outgoing optical signals into the leaky optical fibers. The optical lens has a grazing angle (e.g. substantially 10 degrees) for optical signal injection.

With respect to the mobile control unit 123, it includes one or more communication interfaces (e.g. one or more Ethernet ports) for bidirectionally exchanging data with the conversion modules 122 and 124. The control mobile unit 123 also comprises one or more processors, and memory, for processing the data received from the conversion module 122 and generating the data transmitted to the conversion module 124. One or more computer programs are executed by the one or more processors of the mobile control unit 123. The mobile control unit 123 further comprises actuators for actuating other devices integrated to the mobile apparatus 120 (not represented in the Figures for simplification purposes). The actuators are controlled by the computer program(s) executed by the processor(s) of the mobile control unit 123. The data transported by the leaked incoming optical signals include commands, which are processed by the computer program(s) for controlling the actuators. Various types of actuators (e.g. mechanical, hydraulic, electric, electronic, etc.) can be used. The actuators actuate the various types of devices integrated to the mobile apparatus 120, such as motor(s) for moving the mobile apparatus 120 on the rail 130, camera(s), special effect generators (e.g. smoke generators, light generators, sound generators), etc. For example, the data transported by the leaked incoming optical signals include commands for controlling the speed and the moving direction of the mobile apparatus 120, commands for controlling a camera, etc. The various types of devices integrated to the mobile apparatus 120 also generate data, which are collected by the mobile control unit 123, for example via dedicated sensors. At least some of these data are transmitted via the injected outgoing optical signals. For example, the data transported by the injected outgoing optical signals include a measure of the current speed and acceleration of the mobile apparatus 120, images collected by a camera, etc.

In a particular implementation, the optical reception module 121 and the optical transmission module 125 may be implemented by a single optical transceiver module capable of receiving and transmitting optical signals.

Figure 5:
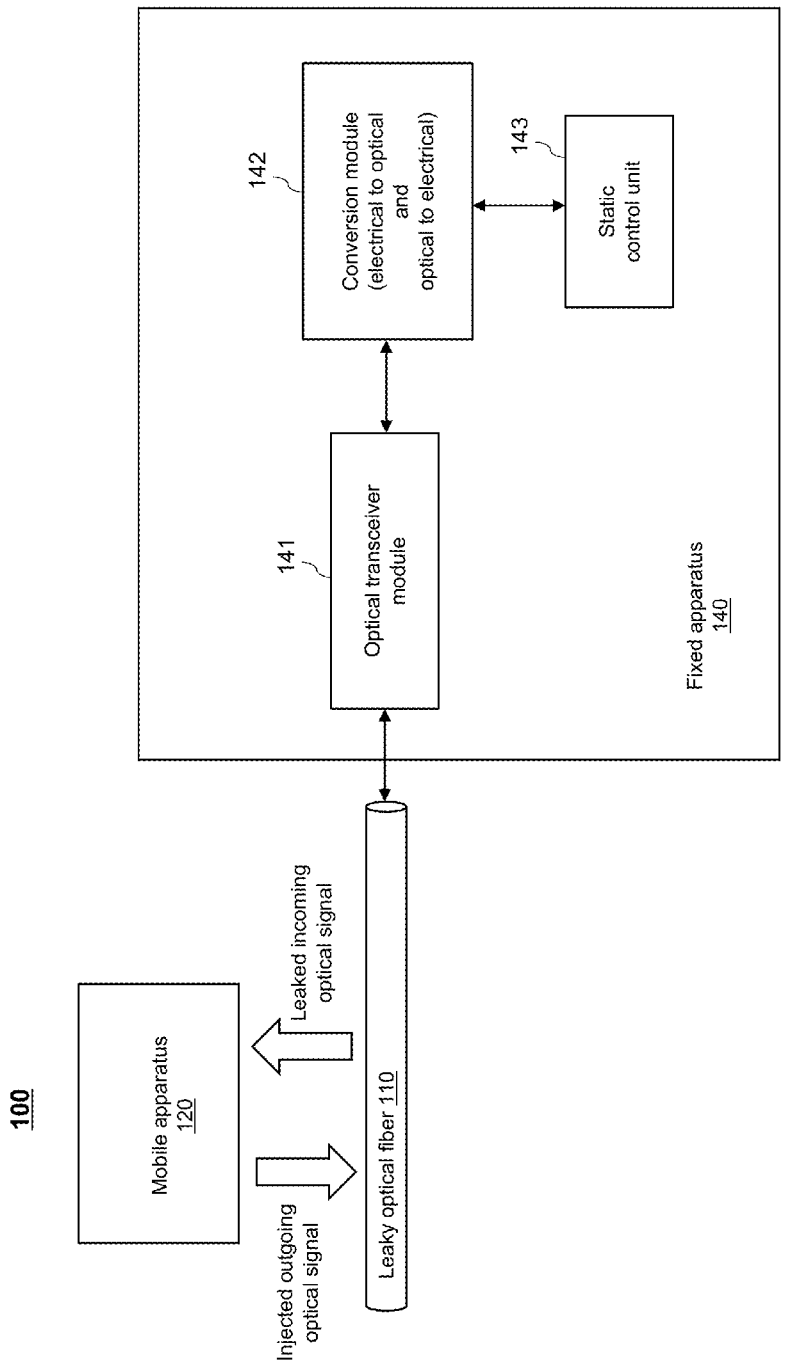
FIG. 5 illustrates the system represented in FIG. 3 interacting with a fixed apparatus.

Referring now to FIG. 5, details of the fixed apparatus 140 represented in FIG. 1 are provided in the case of the use a single leaky optical fiber 110 as illustrated in FIG. 3.

The fixed apparatus 140 comprises an optical transceiver module 141. The optical transceiver module 141 injects into the leaky optical fiber 110 the incoming optical signals received by the mobile apparatus 120. The optical transceiver module 141 receives from the leaky optical fiber 110 the outgoing optical signals transmitted by the mobile apparatus 120.

The fixed apparatus 140 comprises a conversion module 142. The conversion module 142 converts the optical signals received by the optical transceiver module 141 from the leaky optical fiber 110 into electrical signals. The conversion module 142 converts electrical signals received from a static control unit 143 into the optical signals injected by the optical transceiver module 141 into the leaky optical fiber 110.

The static control unit 143 processes the electrical signals converted by the conversion module 142, to extract data from the electrical signals. The data are further processed by the static control unit 143, or by another component of the fixed apparatus 140 not represented in FIG. 5 for simplification purposes. The data extracted from the electrical signals were initially generated and transmitted by the mobile apparatus 120, as previously illustrated in relation to FIG. 3.

The static control unit 143 also processes data to generate the electrical signals converted by the conversion module 142 into the optical signals injected by the optical transceiver module 141 into the leaky optical fiber 110. The data are generated by the static control unit 143, or by another component of the fixed apparatus 140 not represented in FIG. 5 for simplification purposes. The data are ultimately received and processed by the mobile apparatus 120, as previously illustrated in relation to FIG. 3.

The implementation of the fixed apparatus 140 is well known in the art, and may vary. The exemplary fixed apparatus 140 represented in FIG. 5 is for illustration purposes only.

Referring now concurrently to FIGS. 3 and 5, in a particular implementation, the static control unit 143 of the fixed apparatus 140 and the mobile control unit 123 of the mobile apparatus 120 generate Ethernet frames transporting the data exchanged between the static control unit 143 and the mobile control unit 123. As is well known in the art, the Internet Protocol (IP) as well as the User Datagram Protocol (UDP) and/or the Transport Control Protocol (TCP) can be used in combination with the Ethernet protocol. The data generated by the static control unit 143 and the mobile control unit 123 are embedded in IP packets (comprising an UDP or TCP header), the IP packets being embedded in Ethernet frames. The Ethernet frames are transported directly over the leaky optical fiber 110. Alternatively, the conversion modules 122 and 124 of the mobile apparatus 120 and the conversion module 142 of the fixed apparatus 140 implement Ethernet to fiber and fiber to Ethernet conversion functionalities; and the leaky optical fiber 110 transports the IP packets.

Figure 6:
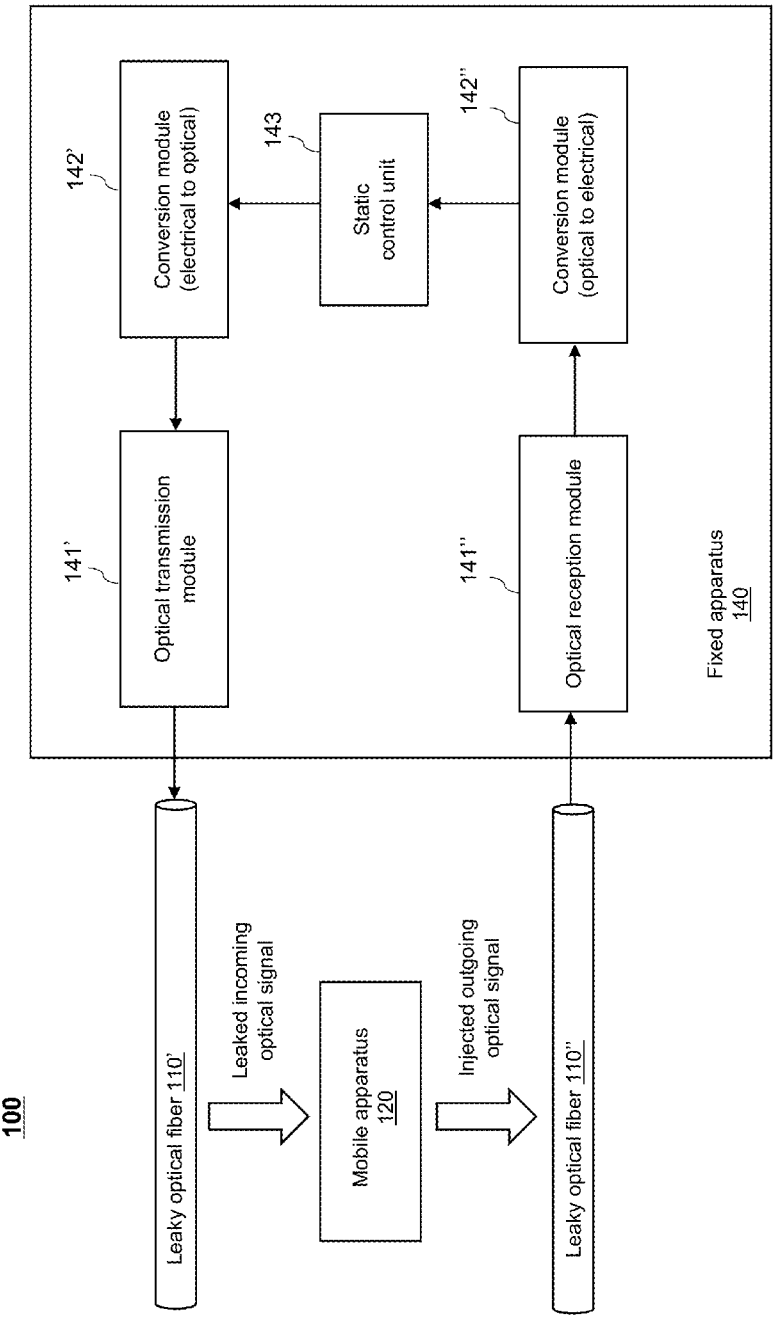
FIG. 6 illustrates the system represented in FIG. 4 interacting with a fixed apparatus.

Referring now to FIG. 6, details of the fixed apparatus 140 represented in FIG. 1 are provided in the case of two leaky optical fibers 110' and 110" as illustrated in FIG. 4.

The fixed apparatus 140 comprises an optical transmission module 141'. The optical transmission module 141' injects into the leaky optical fiber 110' the incoming optical signals received by the mobile apparatus 120.

The fixed apparatus 140 comprises a conversion module 142'. The conversion module 142' converts electrical signals received from the static control unit 143 into the optical signals injected by the optical transmission module 141' into the leaky optical fiber 110'.

The static control unit 143 processes data to generate the electrical signals converted by the conversion module 142' into the optical signals injected by the optical transmission module 141' into the leaky optical fiber 110'. The data are generated by the static control unit 143, or by another component of the fixed apparatus 140 not represented in FIG. 6 for simplification purposes. The data are ultimately received through the leaky optical fiber 110' and processed by the mobile apparatus 120, as previously illustrated in relation to FIG. 4.

The fixed apparatus 140 comprises an optical reception module 141". The optical reception module 141" receives from the leaky optical fiber 110" the outgoing optical signals transmitted by the mobile apparatus 120.

The fixed apparatus 140 comprises a conversion module 142". The conversion module 142" converts the optical signals received by the optical reception module 141" from the leaky optical fiber 110" into electrical signals.

The static control unit 143 processes the electrical signals converted by the conversion module 142", to extract data from the electrical signals. The data are further processed by the static control unit 143, or by another component of the fixed apparatus 140 not represented in FIG. 6 for simplification purposes. The data extracted from the electrical signals were initially generated and transmitted through the leaky optical fiber 110" by the mobile apparatus 120, as previously illustrated in relation to FIG. 4.

The implementation of the fixed apparatus 140 is well known in the art, and may vary. The exemplary fixed apparatus 140 represented in FIG. 6 is for illustration purposes only.

Figure 7A:
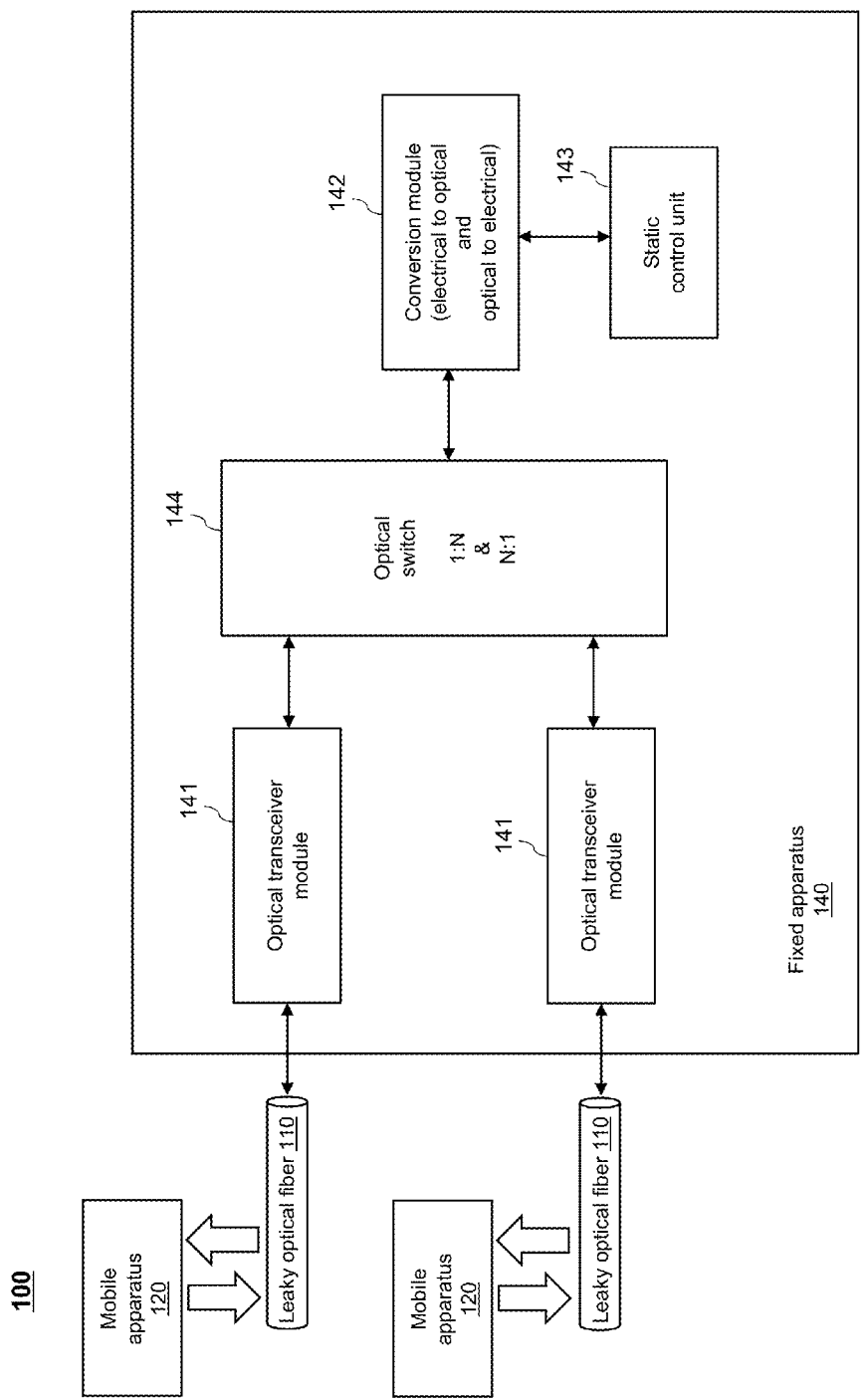
FIG. 7A illustrates the fixed apparatus represented in FIG. 5 interacting with a plurality of mobile apparatus.

Referring now to FIG. 7A, the system 100 is represented with a plurality of mobile apparatus 120 exchanging data with the fixed apparatus 140 through a plurality of leaky optical fibers 110. Each mobile apparatus 120 uses one of the plurality of leaky optical fibers 110 for both receiving optical signals from the fixed apparatus 140 and transmitting optical signals to the fixed apparatus, as described previously in relation to FIG. 3.

The fixed apparatus 140 is similar to the fixed apparatus described previously in relation to FIG. 5. However, the fixed apparatus 140 comprises a plurality of optical transceiver module 141 respectively interfacing with the plurality of leaky optical fibers 110. The fixed apparatus 140 also comprises an optical switch 144 for interfacing the plurality of optical transceiver modules 141 with the conversion module 142. The conversion module 142 and the static control unit 143 operate as described previously in relation to FIG. 5.

The optical switch 144 operates a N:1 optical switching functionality for transmitting the optical signals received by the plurality of optical transceiver modules 141 towards the conversion module 142, as is well known in the art.

The optical switch 144 operates a 1:N optical switching functionality for transmitting the optical signals received from the conversion module 142 towards the appropriate one among the plurality of optical transceiver modules 141, as is well known in the art. For instance, the static control unit 143 controls the 1:N optical switching functionality of the optical switch 144. Based on a mobile apparatus 120 to which the optical signals need to be transmitted, the optical transceiver module 141 interfaced with the leaky optical fiber 110 allowing communication with the mobile apparatus 120 is selected by the 1:N optical switching functionality of the optical switch 144 under the control of the static control unit 143. The optical switch 144 may be replaced by an optical device performing wavelength division multiplexing.

Only two mobile apparatus 120 and two corresponding leaky optical fibers 110 have been represented in FIG. 7A for simplification purposes. However, any number of mobile apparatus 120 may be controlled by the fixed apparatus 140 through a corresponding number of leaky optical fibers 110.

Figure 7B:
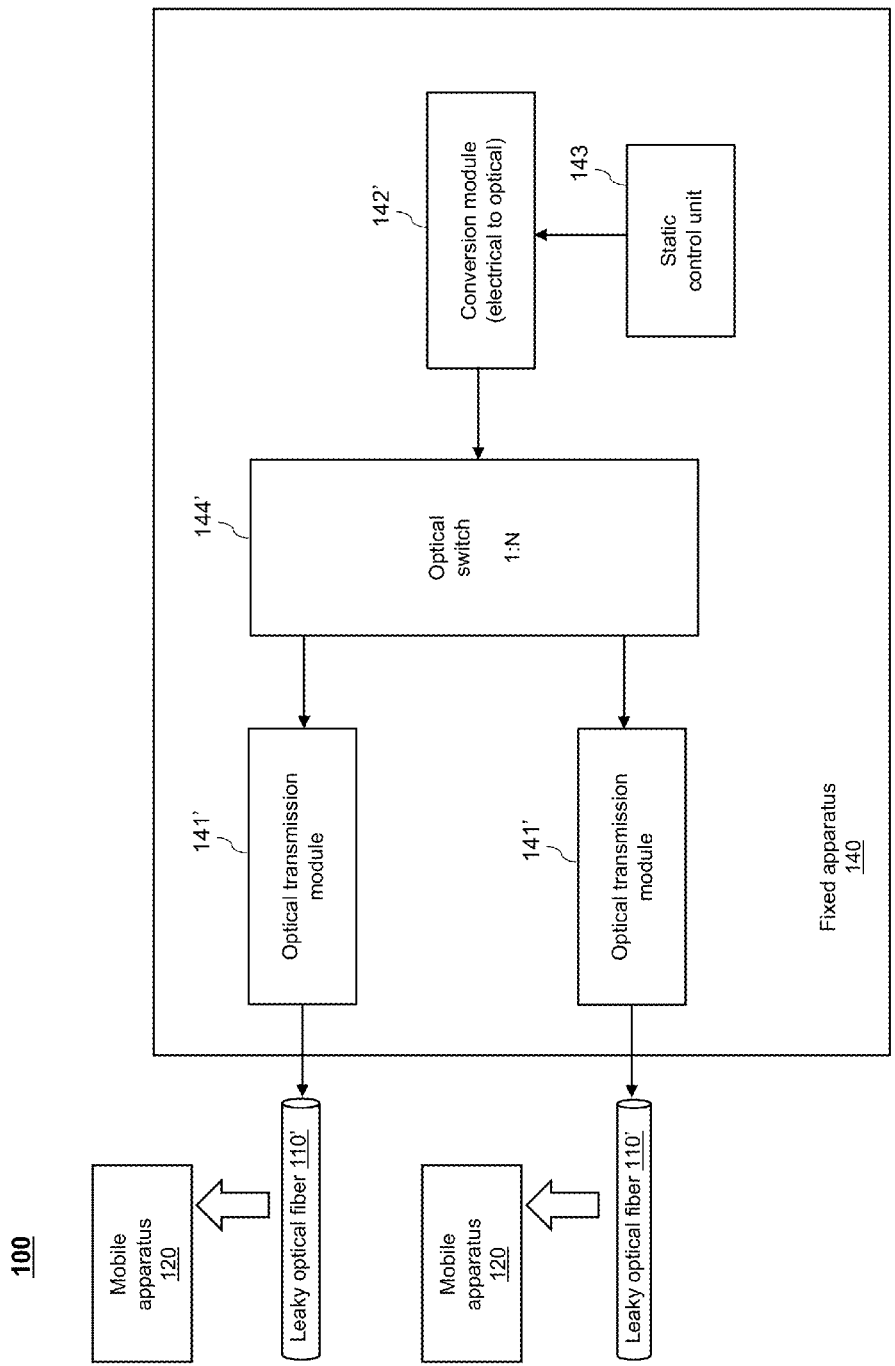
FIGS. 7B and 7C illustrate the fixed apparatus represented in FIG. 6 interacting with a plurality of mobile apparatus.
Figure 7C:
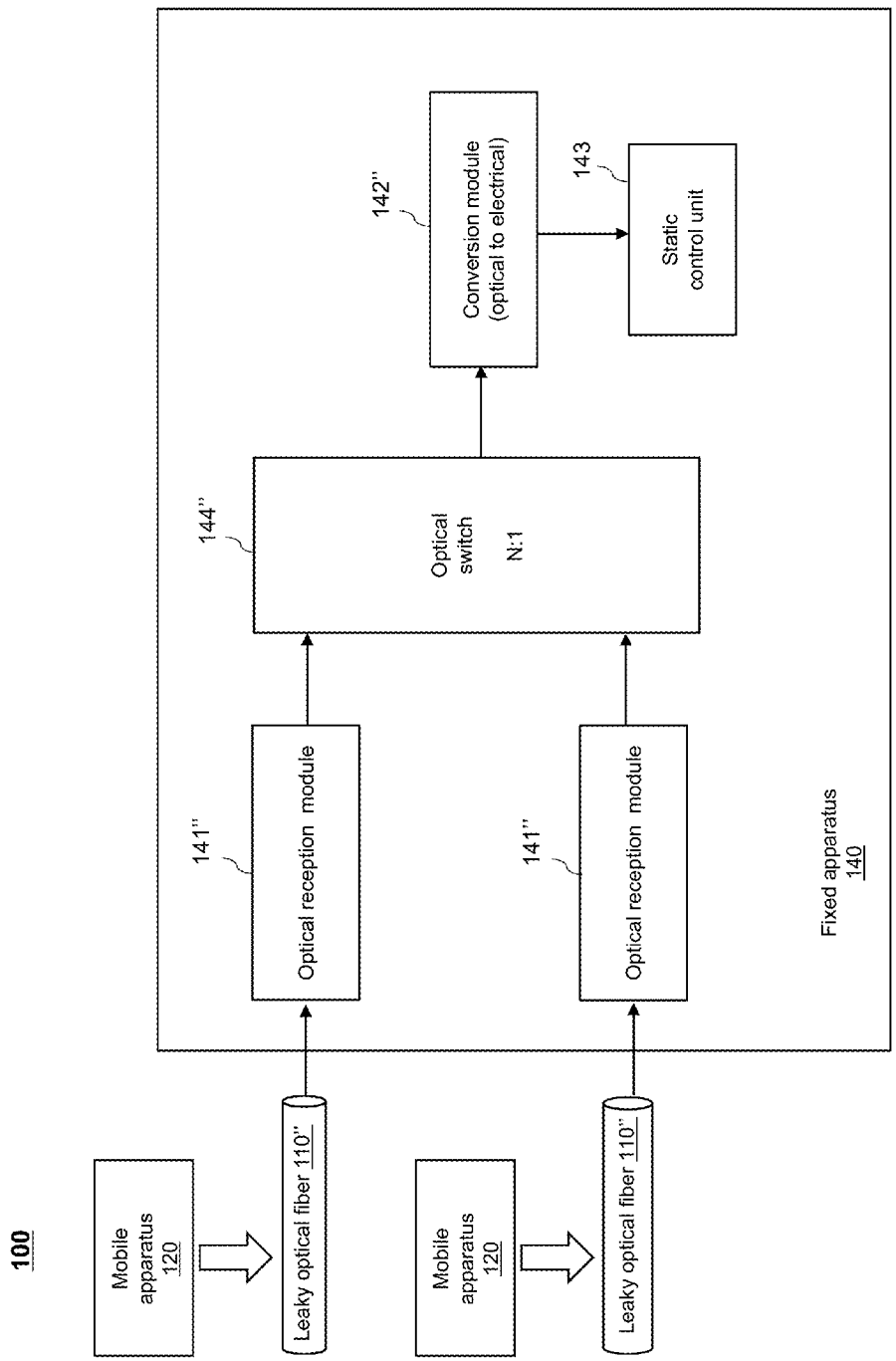

Referring now concurrently to FIGS. 7B and 7C, the system 100 is represented with a plurality of mobile apparatus 120 bidirectionally exchanging data with the fixed apparatus 140 through a plurality of leaky optical fibers. Each mobile apparatus 120 uses a first leaky optical fiber 110' with characteristics optimized for receiving the leaked incoming optical signal, and a second leaky optical fiber 110" with characteristics optimized for injecting the outgoing optical signal, as described previously in relation to FIG. 4. The functionalities of the system 100 and the fixed apparatus 140 have been split between FIGS. 7B and 7C for simplification purposes. However, the fixed apparatus 140 represented in FIGS. 7B and 7C is the same, and the plurality of mobile apparatus 120 represented in FIGS. 7B and 7C are also the same.

The fixed apparatus 140 is similar to the fixed apparatus described previously in relation to FIG. 6. However, the fixed apparatus 140 comprises a plurality of optical transmission modules module 141' (represented in FIG. 7B) respectively interfacing with the plurality of leaky optical fibers 110'. The fixed apparatus 140 also comprises a plurality of optical reception modules module 141" (represented in FIG. 7C) respectively interfacing with the plurality of leaky optical fibers 110".

The fixed apparatus 140 comprises an optical switch 144' (represented in FIG. 7B) for interfacing the plurality of optical transmission modules 141' with the conversion module 142'. The fixed apparatus 140 also comprises an optical switch 144" (represented in FIG. 7C) for interfacing the plurality of optical reception modules 141" with the conversion module 142".

The conversion modules 142', 142" and the static control unit 143 operate as described previously in relation to FIG. 6.

The optical switch 144' operates a 1:N optical switching functionality for transmitting the optical signals received from the conversion module 142' towards the appropriate one among the plurality of optical transmission modules 141', as is well known in the art. For instance, the static control unit 143 controls the 1:N optical switching functionality of the optical switch 144'. Based on a mobile apparatus 120 to which the optical signals need to be transmitted, the optical transmission module 141' interfaced with the leaky optical fiber 110' allowing communication with the mobile apparatus 120 is selected by the 1:N optical switching functionality of the optical switch 144' under the control of the static control unit 143.

The optical switch 144" operates a N:1 optical switching functionality for transmitting the optical signals received by the plurality of optical reception modules 141" towards the conversion module 142", as is well known in the art. The optical switch 144' may be replaced by an optical device performing wavelength division multiplexing.

Only two mobile apparatus 120 and two corresponding pair of leaky optical fibers 110' and 110" have been represented in FIGS. 7B and 7C for simplification purposes. However, any number of mobile apparatus 120 may be controlled by the fixed apparatus 140 through a corresponding number of pair of leaky optical fibers 110' and 110".

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A system for bidirectional exchange of data with a mobile apparatus, the system comprising:
   at least one leaky optical fiber; and
   the mobile apparatus, comprising:
      an optical reception module for receiving an incoming optical signal optically leaked from the at least one leaky optical fiber;
      an optical to electrical conversion module for converting the incoming optical signal into an incoming electrical signal;
      a control unit for:
         processing the incoming electrical signal to extract incoming data from the incoming electrical signal; and
         processing outgoing data to generate an outgoing electrical signal transporting the outgoing data;
      an electrical to optical conversion module for converting the outgoing electrical signal into an outgoing optical signal; and
      an optical transmission module for injecting the outgoing optical signal into the at least one leaky optical fiber, the injection comprising emitting the outgoing optical signal by the optical transmission module and directly receiving the outgoing optical signal emitted by the optical transmission module into the at least one leaky optical fiber.

2. The system of claim 1, wherein the at least one leaky optical fiber is positioned along a path of the mobile apparatus.

3. The system of claim 2, wherein the at least one leaky optical fiber is adapted for allowing reception of the incoming optical signal leaked from the at least one leaky optical fiber and injection of the outgoing optical signal into the at least one leaky optical fiber at any position of the mobile apparatus along the path of the mobile apparatus.

4. The system of claim 1, wherein the mobile apparatus consists of a rail-guided trolley travelling along a rail.

5. The system of claim 4, wherein the at least one leaky optical fiber is embedded in a second rail parallel to the rail guiding the rail-guided trolley for protecting the at least one leaky optical fiber.

6. The system of claim 1, wherein the at least one leaky optical fiber consists of a single leaky optical fiber from which the optical reception module receives the incoming optical signal and into which the optical transmission module injects the outgoing optical signal.

7. The system of claim 1, wherein the at least one leaky optical fiber consists of a first leaky optical fiber from which the optical reception module receives the incoming optical signal and a second leaky optical fiber into which the optical transmission module injects the outgoing optical signal.

8. A method for bidirectional exchange of data with a mobile apparatus through at least one leaky optical fiber, the method comprising:
- receiving by an optical reception module of the mobile apparatus an incoming optical signal from the at least one leaky optical fiber, the incoming optical signal being leaked from the at least one leaky optical fiber;
- converting by an optical to electrical conversion module of the mobile apparatus the incoming optical signal into an incoming electrical signal;
- processing by a control unit of the mobile apparatus the incoming electrical signal to extract incoming data from the incoming electrical signal;
- processing by the control unit of the mobile apparatus outgoing data to generate an outgoing electrical signal transporting the outgoing data;
- converting by an electrical to optical conversion module of the mobile apparatus the outgoing electrical signal into an outgoing optical signal; and
- injecting by an optical transmission module of the mobile apparatus the outgoing optical signal into the at least one leaky optical fiber, the injection comprising emitting the outgoing optical signal by the optical transmission module and directly receiving the outgoing optical signal emitted by the optical transmission module into the at least one leaky optical fiber.

9. The method of claim 8, wherein the at least one leaky optical fiber is positioned along a path along which the mobile apparatus moves.

10. The method of claim 9, wherein the at least one leaky optical fiber is adapted for allowing reception of the incoming optical signal leaked from the at least one leaky optical fiber and injection of the outgoing optical signal into the at least one leaky optical fiber at any position of the mobile apparatus along the path of the mobile apparatus.

11. The method of claim 8, wherein the mobile apparatus consists of a rail-guided trolley travelling along a rail.

12. The method of claim 11, wherein the at least one leaky optical fiber is embedded in a second rail parallel to the rail guiding the rail-guided trolley for protecting the at least one leaky optical fiber.

13. The method of claim 8, wherein the at least one leaky optical fiber consists of a single leaky optical fiber from which the incoming optical signal is received by the optical reception module and into which the outgoing optical signal is injected by the optical transmission module.

14. The method of claim 8, wherein the at least one leaky optical fiber consists of a first leaky optical fiber from which the incoming optical signal is received by the optical reception module and a second leaky optical fiber into which the outgoing optical signal is injected by the optical transmission module.

15. A system for bidirectional exchange of data with a plurality of mobile apparatus through a plurality of leaky optical fibers, the system comprising:
- the plurality of leaky optical fiber;
- the plurality of mobile apparatus, each mobile apparatus comprising:
  - an optical reception module for receiving an incoming optical signal from a first one among the plurality of leaky optical fibers, the incoming optical signal being leaked from the first one among the plurality of leaky optical fibers;
  - an optical to electrical conversion module for converting the incoming optical signal into an incoming electrical signal;
  - a control unit for:
    - processing the incoming electrical signal to extract incoming data from the incoming electrical signal; and
    - processing outgoing data to generate an outgoing electrical signal transporting the outgoing data;
  - an electrical to optical conversion module for converting the outgoing electrical signal into an outgoing optical signal; and
  - an optical transmission module for injecting the outgoing optical signal into a second one among the plurality of leaky optical fibers, the injection comprising emitting the outgoing optical signal by the optical transmission module and directly receiving the outgoing optical signal emitted by the optical transmission module into the second one among the plurality of leaky optical fibers; and
- a fixed apparatus for bidirectionally exchanging the incoming data and the outgoing data with the plurality of mobile apparatus through the plurality of leaky optical fibers.

16. The system of claim 15, wherein the first one among the plurality of leaky optical fibers and the second one among the plurality of leaky optical fibers consist of a single leaky optical fiber from which the incoming optical signal is received by the optical reception module and into which the outgoing optical signal is injected by the optical transmission module.

17. The system of claim 15, wherein the first one among the plurality of leaky optical fibers and the second one among the plurality of leaky optical fibers consist of two different leaky optical fibers.

18. The system of claim 15, wherein the plurality of leaky optical fibers is positioned along a plurality of paths along which the plurality of mobile apparatus move.

* * * * *